(12) United States Patent
Fox et al.

(10) Patent No.: US 12,224,700 B2
(45) Date of Patent: Feb. 11, 2025

(54) STARTER/GENERATOR ARRANGEMENTS FOR GAS TURBINE ENGINES

(71) Applicant: Hamilton Sundstrand Corporation, Charlotte, NC (US)

(72) Inventors: Brennan Fox, Machesney Park, IL (US); Mustansir H. Kheraluwala, Lake Zurich, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 29 days.

(21) Appl. No.: 18/154,363

(22) Filed: Jan. 13, 2023

(65) Prior Publication Data

US 2024/0243677 A1 Jul. 18, 2024

(51) Int. Cl.
| | |
|---|---|
| *H02P 1/30* | (2006.01) |
| *B64D 27/10* | (2006.01) |
| *F02C 6/00* | (2006.01) |
| *F02C 7/268* | (2006.01) |
| *H02P 1/52* | (2006.01) |
| *H02P 3/00* | (2006.01) |
| *H02P 9/02* | (2006.01) |

(52) U.S. Cl.
CPC ............... *H02P 9/02* (2013.01); *B64D 27/10* (2013.01); *F02C 6/00* (2013.01); *F02C 7/268* (2013.01); *F05D 2220/323* (2013.01); *F05D 2220/76* (2013.01); *F05D 2260/85* (2013.01)

(58) Field of Classification Search
CPC ... H02P 9/02; B64D 27/10; F02C 6/00; F02C 7/268
USPC .......................................................... 318/503
See application file for complete search history.

(56) References Cited

U.S. PATENT DOCUMENTS

| 4,093,869 A | 6/1978 | Hoffmann et al. |
|---|---|---|
| 5,097,195 A * | 3/1992 | Raad ....................... F02N 11/04 |
| | | 290/46 |
| 5,546,742 A | 8/1996 | Shekhawat et al. |
| | (Continued) | |

FOREIGN PATENT DOCUMENTS

CN 109713958 A 5/2019

OTHER PUBLICATIONS

Abstract for CN109713958 (A), Published: May 11, 2019, 1 page.
(Continued)

*Primary Examiner* — Erick D Glass
(74) *Attorney, Agent, or Firm* — CANTOR COLBURN LLP

(57) ABSTRACT

A variable frequency starter generator (VFSG) system includes a VFSG having a start mode and a generate mode, a permanent magnet generator (PMG) and a main generator section and an exciter section. The system also includes a controller electrically connected to the VFSG. The controller flow start mode three phase electrical power from aircraft power to the exciter of the VFSG in the start mode and flows single phase electrical power to the exciter of the VFSG in the generate mode. The controller includes: an input active rectifier that receives input AC power and converts it to DC power and provides it to across a positive rail and negative rail; an output inverter coupled to an output of the input active rectifier; and one or more line inductors connected along one or both of the positive rail and negative rail between the input active rectifier and the output inverter.

14 Claims, 3 Drawing Sheets

(56) References Cited

U.S. PATENT DOCUMENTS

| | | | |
|---|---|---|---|
| 6,489,639 B1 * | 12/2002 | Hoke | ................ H01L 29/66462 |
| | | | 257/E29.091 |
| 6,979,979 B2 | 12/2005 | Xu et al. | |
| 6,998,726 B2 | 2/2006 | Sarlioglu et al. | |
| RE40,713 E | 5/2009 | Geis et al. | |
| 7,990,115 B2 | 8/2011 | Anghel et al. | |
| 8,148,834 B2 | 4/2012 | Huang et al. | |
| 9,621,090 B2 | 4/2017 | Chong et al. | |
| 9,776,583 B2 | 10/2017 | Edwards | |
| 10,651,770 B2 * | 5/2020 | Rozman | ................ B64D 41/00 |
| 2011/0227340 A1 | 9/2011 | Rozman et al. | |
| 2015/0244303 A1 | 8/2015 | Gao et al. | |
| 2024/0243638 A1 | 7/2024 | Fox et al. | |

OTHER PUBLICATIONS

European Search Report for Application No. 23218898.7, mailed Jun. 6, 2024, 8 pages.
European Search Report for Application No. 24151831.5, mailed May 13, 2024, 10 pages.
Madonna Vincenzo, et al. "The Rebirth of the current Source Inverter: Advantages for Aerospace Motor Design", IEEE Industrial Electronics Magazine, IEEE, vol. 13, No. 4, Dec. 2019, pp. 65-76.

* cited by examiner

STARTER/GENERATOR ARRANGEMENTS FOR GAS TURBINE ENGINES

BACKGROUND

The present disclosure is generally related to starter/generator arrangements for gas turbine engines, and more particularly to power converters in starter/generator arrangements.

Vehicles, such as aircraft, commonly employ starter/generators for both starting the aircraft engine and generating electrical power for aircraft electrical systems subsequent to starting. A controller commonly cooperates with the starter/generator to convert power flowing to the starter/generator. For example, during engine starting (start mode) the controller generally converts external power into a form suitable for rotating the gas turbine engine rotor using the starter/generator. Once the gas turbine engine has started, the controller then causes the starter/generator to be fed power in a form so that the starter/generator operates in a manner so that it generates power for the aircraft electrical system. This operation is referred to as a generate mode herein.

One example of a starter/generator is a variable frequency starter generator (VFSG). Current VFSG systems are capable of operating in both the two above referred start and generate mode. A typical VFSG includes a three-phase start exciter to enable excitation at zero to low speeds. During start mode, three phase AC power is applied to the VFSG exciter coils to energize the main field. In such a case, the exciter coils are directly hooked up to the aircraft AC bus, which results in the VFSG getting 235 $V_{ACL-N}$ voltage at a frequency between 380-800 Hz.

While this can work well for starting, when in the generate mode, providing three phase power to the exciter coils can result in the back EMF increasing. To counter act this, a crude method of field weaking may be implemented. This can include only providing single phase excitation to the exciter coil (e.g., to Phase B). Such a solution, however, requires adding a capacitor between the open phase and one of the live phases to hold up the open phase so that the back EMF does not drop too low. In generate mode, a flyback converter is used to inject DC current into the exciter Phase B and the return path is through phase C. However, a problem that may occur is that the open phase (e.g., Phase A) may become a search coil and allow for arcing at high voltages.

Such systems and methods have generally been acceptable for their intended purpose. However, there remains a need in the art for improved manners to provide excitation power (e.g., current/voltage) to a VFSG.

BRIEF DESCRIPTION

A VFSG controller and system is provided herein.

In one embodiment, a variable frequency starter generator (VFSG) system is disclosed. The system includes a VFSG having a start mode and a generate mode, a permanent magnet generator (PMG) and a main generator section and an exciter section. The system also includes a controller electrically connected to the VFSG. The controller is configured to flow start mode three phase electrical power from aircraft power to the exciter of the VFSG in the start mode and to flow single phase electrical power to the exciter of the VFSG in the generate mode. The controller includes: an input active rectifier that receives input AC power and converts it to DC power and provides it to across a positive rail and negative rail; an output inverter coupled to an output of the input active rectifier; and one or more line inductors connected along one or both of the positive rail and negative rail between the input active rectifier and the output inverter through which current is provided to the output inverter.

In addition to one or more of the features described above, or as an alternative to any of the foregoing embodiments, the input active rectifier can include a plurality of switch devices operatively associated with a rectifier controller via a pulse width modulation signal to convert power flowing through the controller from AC to DC.

In addition to one or more of the features described above, or as an alternative to any of the foregoing embodiments, the output inverter can include a plurality of switch devices operatively associated with an inverter controller via a pulse width modulation signal to convert DC current from the one or inductors into an AC output current.

In addition to one or more of the features described above, or as an alternative to any of the foregoing embodiments, the controller can include an input selection switch that connects the PMG to the input active rectifier in the generate mode.

In addition to one or more of the features described above, or as an alternative to any of the foregoing embodiments, the input selection switch connects the aircraft power to the input active rectifier in the start mode.

In addition to one or more of the features described above, or as an alternative to any of the foregoing embodiments, wherein the aircraft power is DC power.

In addition to one or more of the features described above, or as an alternative to any of the foregoing embodiments, the aircraft power is AC power.

Also disclosed is a gas turbine engine, that includes a rotor and a VFSG system as recited in any prior embodiment. The rotor is coupled to the VFSG and provides rotational energy to the VFSG during the generate mode.

Technical effects of the present disclosure include a controller that includes the capability to convert the aircraft power (either AC or DC) into a constant frequency 3-phase source for multiphase field winding excitation of the VFSG during starting mode. Furthermore, the controller function as a single-phase excitation source by changing the switch commutation on the output inverter such that only a single phase receives power. This versatility allows for the controller to function as both a starter and a generator controller. As more fully explained below, the controller utilizes a current-source based approach that also allows for removal of the DC-link capacitor which takes up significant weight in a typical exciter drive topology. This capacitor can be replaced with an inductor in one or more embodiments.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
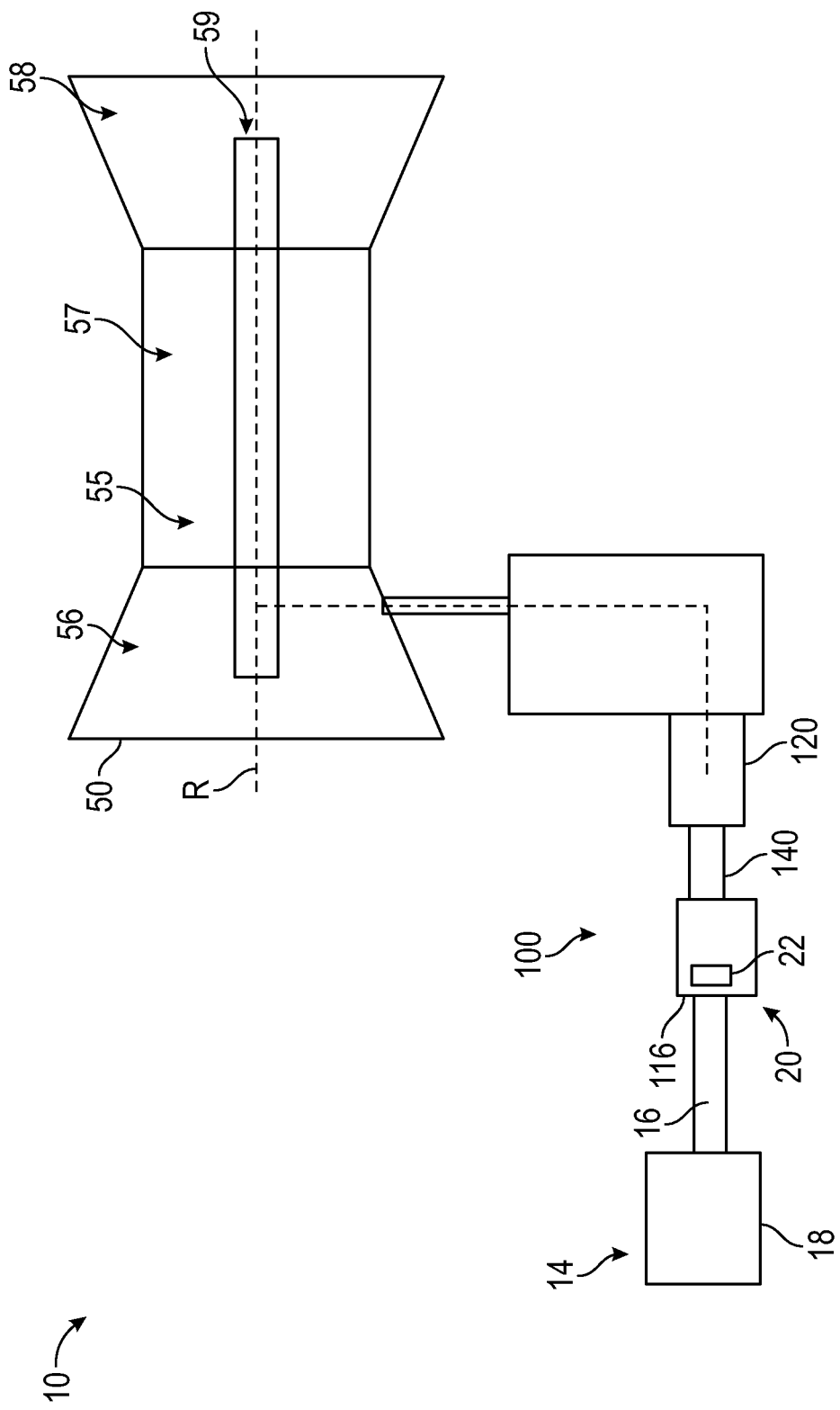
FIG. 1 is a schematic view of a vehicle carrying a gas turbine engine and a starter/generator arrangement.

Reference will now be made to the drawings wherein like reference numerals identify similar structural features or aspects of the subject disclosure. For purposes of explanation and illustration, and not limitation, a partial view of an example of a starter/generator arrangement 100 connected to a gas turbine engine in accordance with the disclosure is shown in FIG. 1. The system includes a controller as more fully disclosed below that can achieve one or more of the above-mentioned technical effects.

Referring to FIG. 1, a vehicle 10, e.g., an aircraft, is shown. The vehicle 10 includes the starter/generator arrangement 100, a gas turbine engine 50, and an electrical system 14.

The electrical system 14 includes a power bus 16, a power source 18, and an electrical load 20. The power bus 16 electrically connects the starter/generator arrangement 100 to the power source 18 and the VFSG 20. It is also contemplated that the power bus 16 communicates from the power source 18 to the VFSG 20 during the start mode. The power source 18 can be either DC or AC. In the event it is AC it can provide differing voltage values. To that end, the power source 18 can be a battery in one embodiment and a generator in another.

Further details of the VFSG 20 are described below but in general, the controller 22 includes one or more circuits that can convert input power (e.g., from the power source or a PMG that is part of the VFSG) into a form that is useful to operate the VFSG in both start and generate modes. Further, in contrast to prior excitation controllers that can create a voltage between the various phases of the exciter field windings, the controller 22 disclosed herein acts as a current source and, thus, can result in removal of the prior art dc-link capacitor. Further, in the prior art, as discussed below, the controller(s) 22 disclosed herein allows for the third phase to be connected in parallel with one of the other operating phases to reduce or eliminate the third phase acting as a search coil.

The gas turbine engine 50 includes a fan section 56, a compressor section 55, a combustor section 57, and a turbine section 58. The fan is supported for rotation about a rotation axis R and is operatively associated with the turbine section 58 by a shaft 59. Although a particular gas turbine engine arrangement is shown and described herein it is to be understood and appreciated that gas turbines having other arrangements can also benefit from the present disclosure.

The starter/generator arrangement 100 generally includes a VFSG 20, a controller 22 and an output shaft 140. During start up, the excitation controller provides three phase current to the field coils/windings of the VGSG 20. This causes the shaft 140 to rotate and, thus, causes the turbine shaft 59 to begin rotating so that it can start. Once the turbine 50 is operating, it produces rotational energy that can then be provided back to the VFSG 20 so that it can generate electricity to be provided to other parts of the aircraft (e.g., the running the VFSG can serve to generate electrical power due to rotational energy).

In the illustrated example the gas turbine engine 12 includes an accessory gearbox 120. The accessory gearbox 120 mechanically connects the VFSG 20 and the turbine 50. Subsequent to starting, e.g., when the VFSG 20 is in the generate mode, the accessory gearbox 120 communicates rotational energy to the VFSG 120. As noted above, the VFSG 20 converts the rotational energy into the electrical power. Further, during startup, the gear box 120 receives rotational energy from the VFSG 20 via shaft 140 and provides it to the turbine 50 to start the turbine 50.

Figure 2:
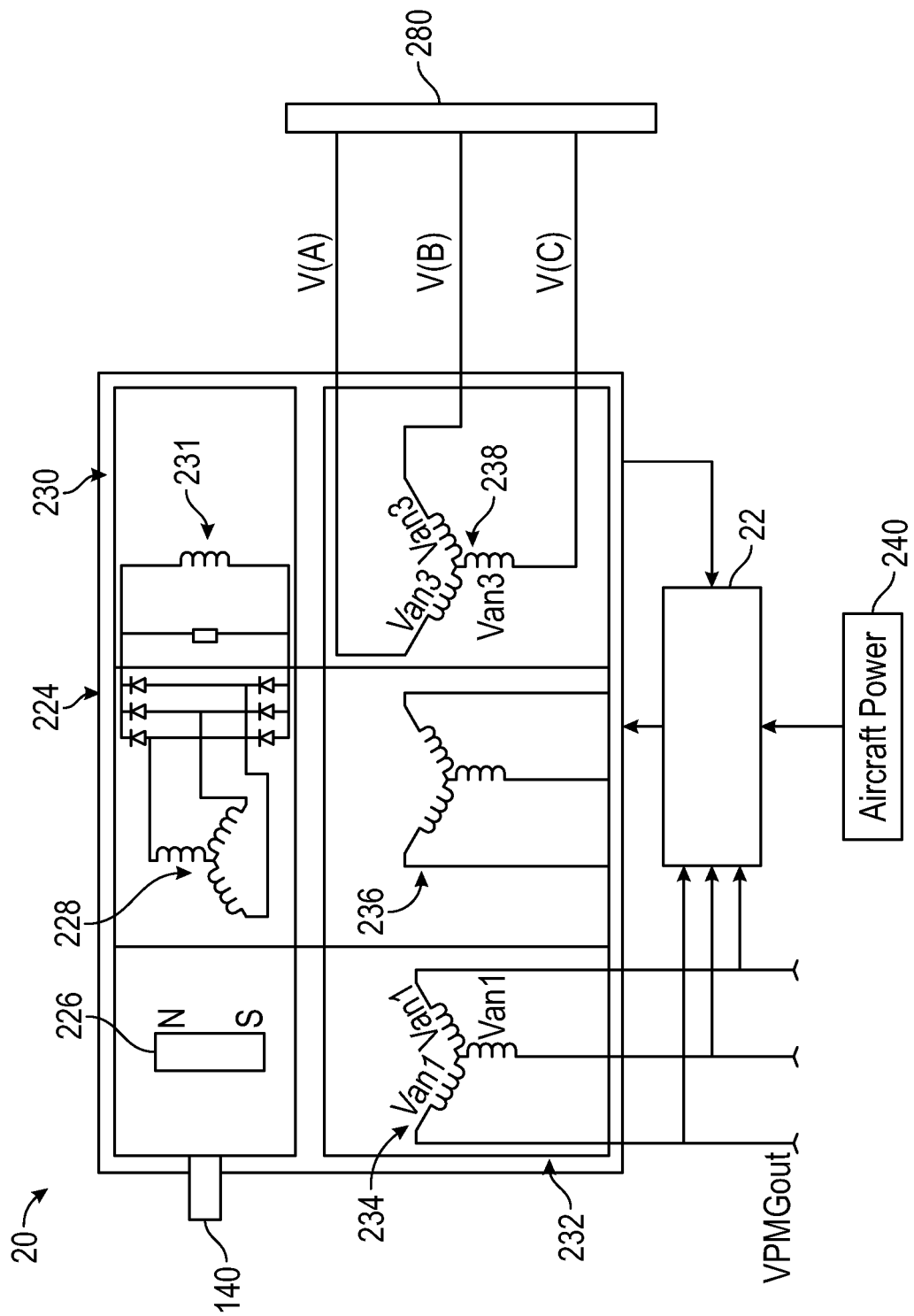
FIG. 2 shows an example VFSG connected to the disclosed excitation controller according to one embodiment.

FIG. 2 shows a simplified example of a VFSG 20. The VFSG 20 is connected to controller 22. The controller 22 can be any controller disclosed herein and can operate to provide current to various portions of the exciter field winding(s) during both start and generate modes.

VFSG 20 includes a rotor portion 224 and stator portion 232. The rotor portion 224 includes a permanent magnet portion 226, an exciter rotor portion 228 and a main field rotor portion 230. The stator portion 232 includes a PMG stator coils 234, exciter stator portion 236, and main field stator windings 38.

As shown, the controller can receive power from aircraft power 240. The aircraft power 240 can be AC or DC. For example, aircraft power 240 can be a battery on the aircraft, power from a ground cart connected to the aircraft, an auxiliary power unit (APU).

During start up, the controller 22 is configured so that it provides three phase power to the exciter stator portion 236. While the exciter stator portion 236 is illustrated as having a three winding, the exciter stator portion can operate in the generate mode with where only one phase is powered. This causes a rotating magnetic field that interacts with 3-phase coils in the exciter rotor portion 228. The interaction will induce ac voltage in the exciter rotor windings. This induced ac voltage is then rectified to dc (on the rotor), which is then applied to the rotor winding of the main machine. Concurrently, the separate motor controller 280 applies appropriate high voltage/current on the V(A), V(B), V(C) stator terminals of the main machine. The interaction between the main stator rotating magnetic field produced by the 3-phase AC voltages applied by the motor controller, and the dc magnetic field on the main rotor causes the rotor 140 to rotate. This rotation can be used to get the turbine (50, FIG. 1) to begin rotation and then, eventually, started.

After the turbine 50 has reached an operation speed, the controller 22 can operate the VFSG 20 in the generate mode. In the generate mode, the turbine (via rotor 140) provides mechanical energy to rotor portion 224, causing permanent magnet portion 26, rotor exciter portion 228, and main field rotor portion 230 to rotate. The rotation of permanent magnet portion 226 generates an alternating current (AC) voltage in PMG stator coils 234, labeled Van1, Vbn1, and Vcn1. The outputs of PMG stator coils 234 are provided to controller 22, which rectifies the AC input and provides a DC excitation current to exciter stator portion 236. These output voltages may collectively be referred to VPMGout in FIG. 3. For convenience, the PMG portions 226/234 can be referred to as the PMG 227 herein.

Based on the magnitude of the excitation current provided to exciter stator portion 236, the exciter rotor portion 228 generates an AC output that is rectified and provided to main field rotor portion 230 to couple the exciter stator current to the main field rotor current by rotation. In response to the rotating field established by main field rotor portion 230, and in particular, coil 231, the main field stator windings 238 generate a variable frequency (based on the speed of the rotor 140) main AC voltages labeled Van3, Vbn3, and Vcn3. The main AC voltages Van3, Vbn3, and Vcn3 may then be provided as an output in which they are labeled AC output voltages V(A), V(B), and V(C).

Figure 3:
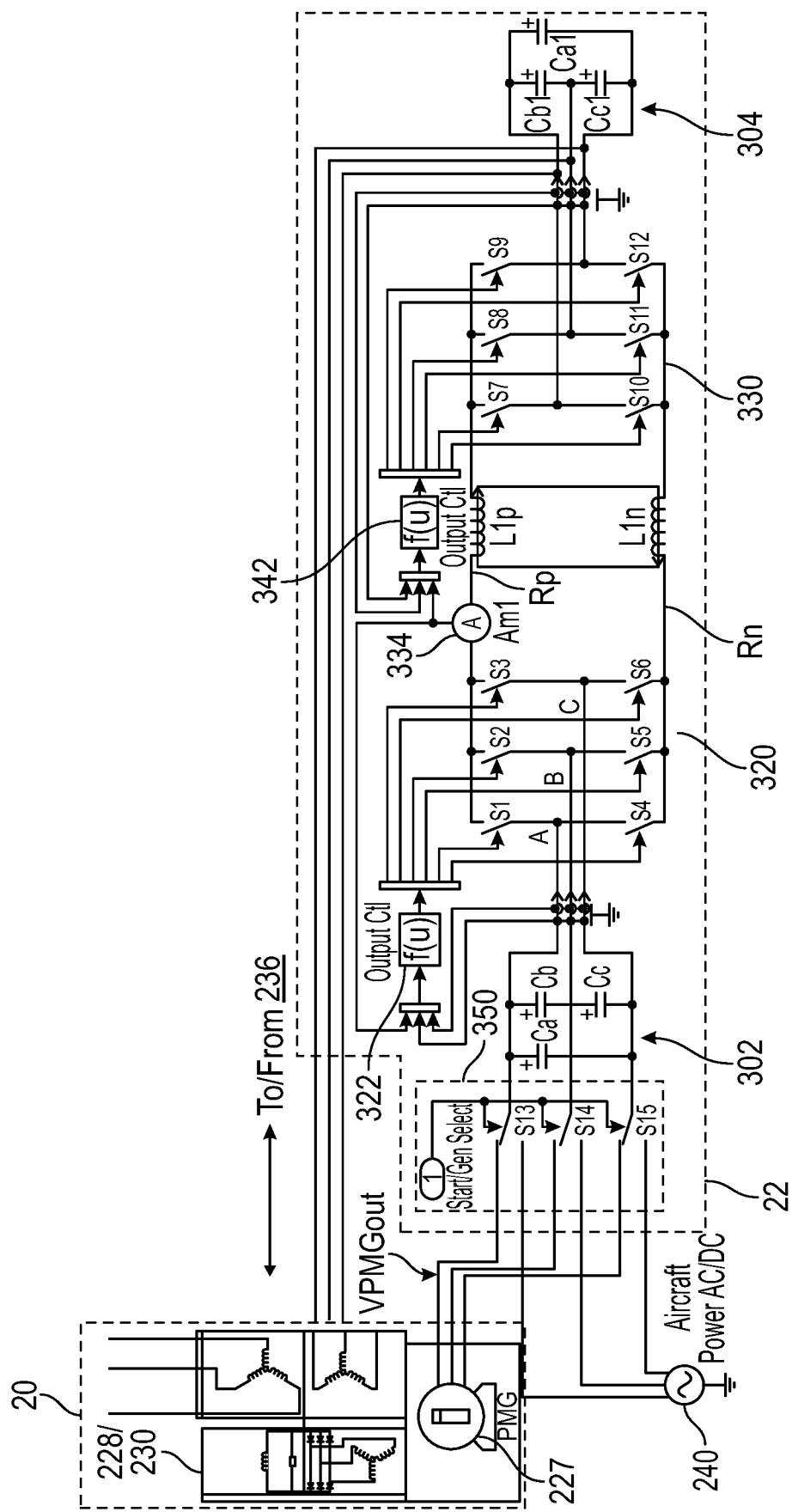
FIG. 3 shows the VFSG of FIG. 2 in a simplified form and includes further details of the controller.

FIG. 3 shows a system that includes VFSG 20 connected to a controller 22. The controller 22 is shown in greater detail than in FIG. 2 and the VFSG 20 is simplified relative to FIG. 2.

The controller 22 operates as either an AC to DC converter or a DC to DC converter to convert an input during start phase to the exciter stator portion 236. The power can come, for example, from the aircraft power 240.

During the generate phase, the controller 22 functions as an AC to AC converter that receives power from the PMG 227 and provides single-phase excitation to the exciter stator portion 236.

The controller 22 includes an input filter 302. As shown, the input filter 302 is formed of three input capacitors Ca, Cb, and Cc. The capacitors are connected across/between adjacent phases of the input power (e.g., across the three phases of the PMG 227 or phases (single or three) provided by the aircraft power 240.

The controller includes an input rectifier 320. The rectifier shown in FIG. 3 is an active rectifier 320. The active rectifier 320 is controlled by a rectifier controller 322 such that it either passes DC power or converts AC power received from the PMG 227 into DC power. The active rectifier includes three input phases (A, B, C) and includes switches S1-S6 connected in a typical manner and as illustrated in FIG. 3. The result is a DC output that is provided across rail a positive rail (Rp) and a negative or return rail (Rn).

The controller 22 also includes an output inverter 330. The output inverter 330 creates either a single or three phase AC output from the DC output created by the active rectifier 330. The output inverter 330 includes switches S7-S12 that are controller by an inverter controller 342. In the start mode, the inverter controller 342 provides a three phase AC output. The amplitude of the phases can be controlled by utilizing a pulse width modulation scheme as is known in the art and based on current exiting the active rectifier 320 as measured by a sensor such as current sensor 334. An optional output filter 304 is formed of three output capacitors Ca1, Cb1, and Cc1. The capacitors are connected across/between adjacent phases of the of the output of the inverter 330.

The controller 22 also includes positive and negative inductors (L1p and L1n) connected along Rp and Rn between the active rectifier 320 and the output inverter 330. The output of the output inverter 330 is connected to the field windings 236 as indicated in FIG. 3. The inductors L1p and L1n affect the output of the active rectifier 320 to create a current source that can be provided to the VFSG through the output inverter 330.

When in generate mode, the switches (S7-S12) can be arranged and opened/closed so that current is provided into one phase winding and returns through the other. The other winding can be connected in parallel with either the input or return winding. The magnitude of the single phase can be based on the current measured by the current sensor 334 and the desired generated output voltage of the VFSG 20.

The controller 22 also includes an input selection switch 350 formed of switches S13-S15. In the generate mode, the active rectifier 320 is connected to VPMGout of the PMG 227. In the start mode, the active rectifier 320 is connected to the aircraft power 240. As noted above, the aircraft power 240 can be AC or DC.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable frequency starter generator (VFSG) system, comprising:
    a VFSG having a start mode and a generate mode, a permanent magnet generator (PMG) and a main generator section and an exciter section; and
    a controller electrically connected to the VFSG, the controller configured to flow start mode three phase electrical power from aircraft power to the exciter of the VFSG in the start mode and to flow single phase electrical power to the exciter of the VFSG in the generate mode, the controller including:
        an input active rectifier that receives input AC power and converts it to DC power and provides it to across a positive rail and negative rail;
        an output inverter coupled to an output of the input active rectifier; and
        one or more line inductors connected along one or both of the positive rail and negative rail between the input active rectifier and the output inverter through which current is provided to the output inverter.

2. The VFSG system of claim 1, wherein the input active rectifier includes a plurality of switch devices operatively associated with a rectifier controller via a pulse width modulation signal to convert power flowing through the controller from AC to DC.

3. The VFSG system of claim 1, wherein the output inverter includes a plurality of switch devices operatively associated with an inverter controller via a pulse width modulation signal to convert DC current from the one or inductors into an AC output current.

4. The VFSG system of claim 1, wherein the controller includes an input selection switch that connects the PMG to the input active rectifier in the generate mode.

5. The VFSG system of claim 4, wherein the input selection switch connects the aircraft power to the input active rectifier in the start mode.

6. The VFSG system of claim 5, wherein the aircraft power is DC power.

7. The VFSG system of claim 6, wherein the aircraft power is AC power.

8. A gas turbine engine, comprising:
    a rotor; and
    a VFSG system as recited in claim 1, wherein the rotor is coupled to the VFSG and provides rotational energy to the VFSG during the generate mode.

9. The gas turbine engine of claim 8, wherein the input active rectifier includes a plurality of switch devices operatively associated with a rectifier controller via a pulse width modulation signal to convert power flowing through the controller from AC to DC.

10. The gas turbine engine of claim 8, wherein the output inverter includes a plurality of switch devices operatively associated with an inverter controller via a pulse width modulation signal to convert DC current from the one or inductors into an AC output current.

11. The gas turbine engine of claim 8, wherein the controller includes an input selection switch that connects the PMG to the input active rectifier in the generate mode.

12. The gas turbine engine of claim 11, wherein the input selection switch that connects the aircraft power to the input active rectifier in the start mode.

13. The gas turbine engine of claim 12, wherein the aircraft power is DC power.

14. The gas turbine engine of claim 12, wherein the aircraft power is AC power.

* * * * *